April 20, 1965 D. E. PHILLIPS 3,179,422
SELF-COMPENSATING SHAFT SEAL
Filed April 10, 1962 3 Sheets-Sheet 1

INVENTOR
DAVID E. PHILLIPS
BY
HIS ATTORNEY

April 20, 1965     D. E. PHILLIPS     3,179,422
SELF-COMPENSATING SHAFT SEAL

Filed April 10, 1962     3 Sheets-Sheet 2

INVENTOR
DAVID E. PHILLIPS
BY
HIS ATTORNEY

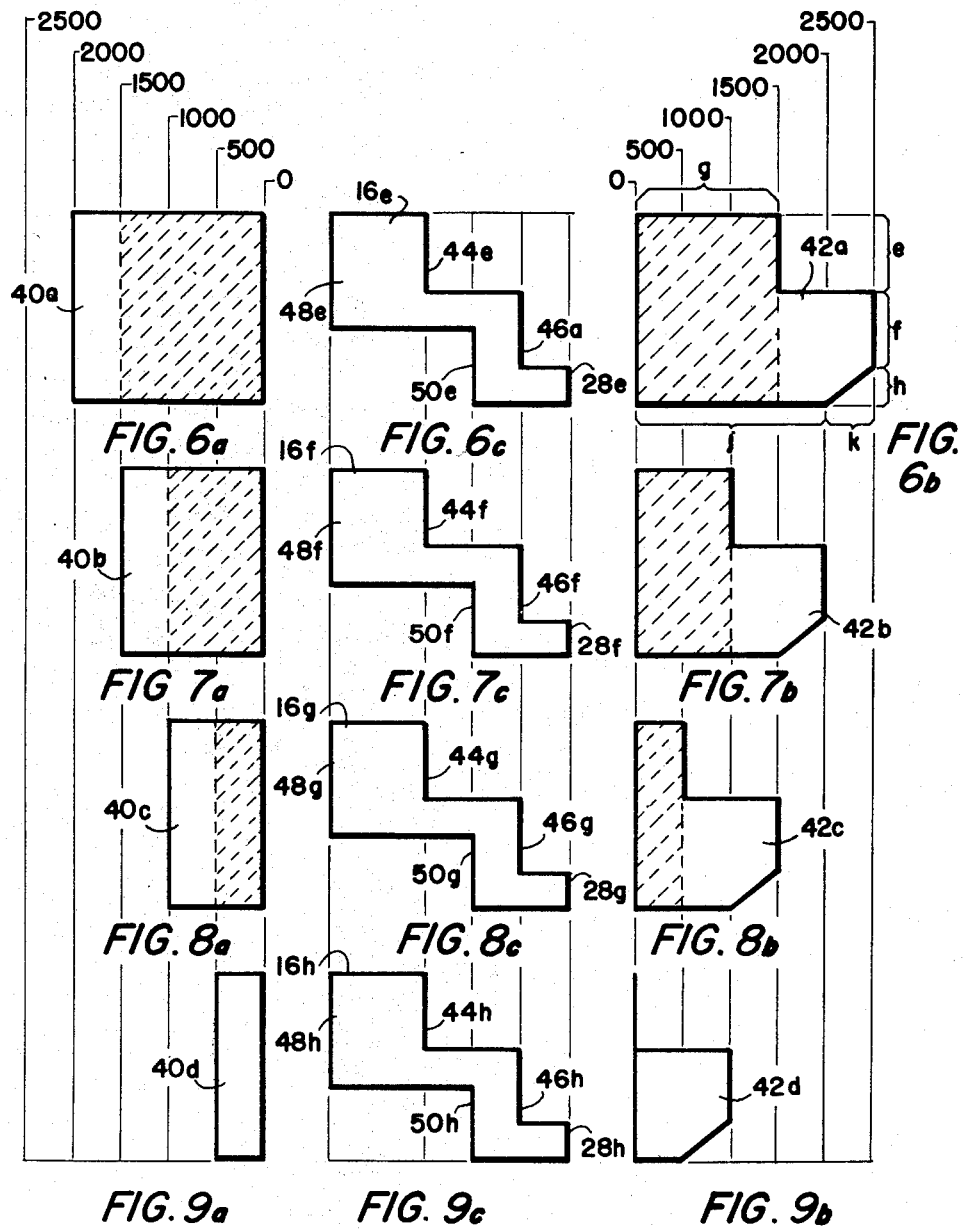

United States Patent Office 3,179,422
Patented Apr. 20, 1965

3,179,422
SELF-COMPENSATING SHAFT SEAL
David E. Phillips, Simsbury, Conn., assignor to Ingersoll-Rand Company, New York, N.Y., a corporation of New Jersey
Filed Apr. 10, 1962, Ser. No. 186,557
24 Claims. (Cl. 277—3)

This invention relates to a shaft seal and more particularly to an improved shaft seal for a rotary pump shaft where it is desired to keep the leakage in a shaft seal to a minimum.

Heretofore, shaft seals of the mechanical type have been used wherein a member rotatable with the pump shaft has a surface which is in rubbing contact with a non-rotating surface on the pump casing to thereby provide a seal between the contact surfaces of the rotating and non-rotating members. These known types of mechanical seals may consist of a collar connected to rotate with a pump shaft and a non-rotating annular member adjacent to the collar which makes contact with one side of the collar to provide the seal. In some cases the rotating collar may consist of an axially movable ring which is urged against the non-rotating annular member by means of a spring or hydraulic force. One disadvantage inherent in this type of mechanical seal is that since there is a rubbing contact between the rotating and non-rotating parts of the seal, the parts are subject to breakage and wear. Also in cases where the pump shaft or seal parts are not in proper alignment, the seal will not wear on an even surface resulting in a poor sealing effect.

In another known type of seal, injection fluid may be used to create a seal between the rotating shaft and the pump casing. In this type of sealing system, injection fluid is forced through the clearance between the pump shaft and the pump casing to thereby prevent the pump fluid from leaking out through this clearance space since the injection fluid would be introduced at a pressure higher than the pump discharge pressure. The disadvantages of this type seal are that the leakage rate is relatively high, the injection fluid is wasted, and the power required to pump the injection fluid is lost since the injection fluid leaks to atmospheric pressure. In addition proper clearances between the shaft and casing are required to be maintained for effective sealing, and since the clearances are radial in most cases, the parts must be replaced or repaired to compensate for wear.

It is the general object of the present invention to avoid and overcome the foregoing and other difficulties of and objections to prior art practices by the provision of a self-compensating seal which automatically pressure balances itself to provide a proper clearance between the sealing members.

Another object of the present invention is to provide a shaft seal in which the pressure through the seal is broken down in stages.

Still another object of the present invention is the provision of a shaft seal which will consistently maintain a minimum amount of leakage while sealing a fluid which varies in pressure.

Yet another object of the present invention is the provision of a seal which is automatically self compensating as the pressure of the fluid varies.

A further object of the present invention is the provision of a shaft seal having a plurality of sealing members each having approximately the same pressure differential across their faces.

A still further object of the present invention is the provision of a seal which is operable as a high pressure seal.

Yet a further object of the present invention is the provision of a seal which is self compensating for wear of the sealing surfaces.

Yet still a further object of the present invention is the provision of a seal in which the amount of leakage may be varied.

The aforesaid objects of the present invention and other objects which will become apparent as the description proceeds are achieved by mounting a non-rotating sealing ring adjacent to a rotating collar on the pump shaft wherein the sealing ring is pressure balanced to maintain the proper clearance with the rotating collar. The forces acting on the sealing ring brought about by the pressures of the pump fluid acting on the faces of the sealing ring are such that the sealing ring, which is movable longitudinally toward and away from the rotaing collar on the shaft, is made to shift axially to vary the distance between the sealing ring and the rotating collar and thereby vary the distance between the respective sealing surfaces.

For a better understanding of the present invention, reference should be had to the accompanying drawings, wherein like numerals of reference indicate similar parts throughout the several views and wherein:

FIGS. 6a–6c, 7a–7c, 8a–8c, 9a–9c are graphic representations similar to FIGS. 2a–2c, of the forces acting on each of the sealing rings of FIG. 5 when the pressure drop through the seal is evenly split in each stage;

Figure 1:
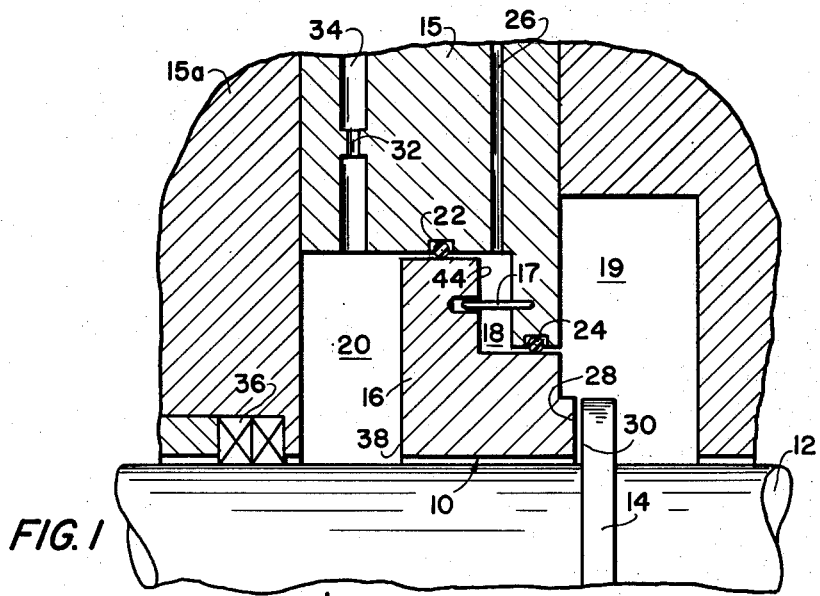
FIG. 1 is a fragmentary sectional view of a self-compensating seal having one sealing ring.

With specific reference to the form of the present invention illustrated in the drawings, and referring particularly to FIG. 1, the improved seal of the present invention is indicated generally by the reference numeral 10.

To provide a seal about a rotating pump shaft 12, a rotating collar 14 is provided for rotation with the pump shaft 12. About the rotatable shaft 12 a seal housing 15, 15a is provided which serves, among other things, to provide a housing for a non-rotating sealing ring 16. The sealing ring 16 is held against rotation in any well known manner, such as for example a pin 17 extending from the seal housing 15 into the sealing ring 16. Although this pin connection does not allow the sealing ring 16 to rotate, the connection is such that the sealing ring 16 is allowed to move in a longitudinal direction parallel to the axis of the shaft 12.

A venting chamber 18 and a backing chamber 20 are formed by surfaces of the sealing ring 16 and the seal housing 15, 15a. The venting chamber 18 is sealed from the backing chamber 20 by any conventional sealing means, such as a flexible sealing ring 22. The venting chamber 18 is also sealed off from the pump discharge in chamber 19 by similar sealing means, such as a flexible sealing ring 24.

By means of the two flexible sealings rings 22 and 24 the pressure in the venting chamber 18 may be maintained at a pressure independent of the pressures on the opposite side of the flexible seals 22, 24.

The sealing ring 16 has an annular surface 28 adjacent an annular surface 30 on rotating collar 14. These two sealing or restrictive surfaces 28, 30 provide a restriction which tends to prevent the high pressure pump fluid from flowing from the chamber 19 to the backing chamber 20. Any leakage finding its way into backing chamber 20 will eventually flow out through the restriction 32 in leakage passageway 34 since a conventional low pressure no-leakage seal 36 is provided to prevent any further flow along the pump shaft 12. The no-leakage seal 36 may be any well known type of packing or mechanical seal which will completely seal off the relatively low pressure in the backing chamber 20 from atmospheric pressure at the opposite side of the seal 36.

Figure 2A:
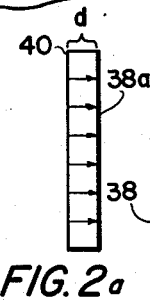
FIGS. 2a and 2b are schematic sketches depicting the forces acting on the sealing ring shown in FIG. 1.
Figure 2C:
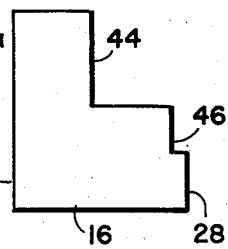
FIG. 2c is a fragmentary sectional view of the sealing ring.

In order to facilitate the description of the operation of this sealing device, a graphic representation of the forces acting on the sealing ring 16 is shown in FIG. 2. The total force acting on the rearward surface 38 (as viewed in FIGS. 1 and 2c) of the sealing ring 16 is equal to the pressure in the backing chamber 20 multiplied by the area of the rearward surface 38 which extends completely around the periphery of the shaft 12. This force is evenly distributed along the surface 38 and is graphically represented by the area enclosed within the rectangle 40 of FIG. 2a wherein one side 38a of the rectangle represents the area of surface 38 of sealing ring 16 and the other side $d$ represents the pressure in backing chamber 20. It is to be noted that the side 38a of rectangle 40 appears to represent the force acting along a radial line of the sealing ring 16, however, it is to be understood that the rearward surface 38 of sealing ring extends completely around the shaft 12 (FIG. 1) so that the surface 38 is in the form of an annulus and the side 38a is representative of the area of this annulus.

Figure 2B:
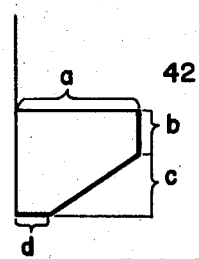

The force acting upon the opposite or forward side 28, 44, 46 (as viewed in FIG. 1) of this sealing ring 16 is graphically represented by the area enclosed within the polygon 42 of FIG. 2b. The force acting on the surface 44 of sealing ring 16 is proportional to the pressure in the venting chamber 18 and assuming in this particular case that the venting chamber 18 is vented to atmosphere through the passageway 26, then the total force acting on the surface 44 is zero.

Since the surface 46 on the sealing ring 16 is exposed to the pump pressure in chamber 19, the force acting on this surface 46 is graphically defined by the rectangular area $ab$ within polygon 42 shown in FIG. 2b, wherein $b$ represents the surface area of annulus 46 and $a$ represents the fluid pump pressure in the chamber 19 acting on the surface 46.

Since there is a leakage flow past the surfaces 28, 30 there will be a gradual pressure drop across these surfaces as the pump fluid flows from the chamber 19 past the surfaces 28, 30 into the backing chamber 20. The force acting on the surface 28 of the sealing ring 16 will be graphically represented by the trapezoidal area $acd$ enclosed within the polygon 42 in FIG. 2b, wherein $a$ represents the pump fluid pressure in chamber 19, $d$ represents the fluid pressure in backing chamber 20, and $c$ represents the surface area of annulus 28. This graphic representation is so because the pressure of the leakage fluid is gradually reduced as the leakage flow passes from the outer periphery of surfaces 28, 30 to the inner periphery of surfaces 28, 30. Thus it can be seen in FIGS. 2a–2c that when the force represented by the enclosed area in block 40 equals the force represented by the enclosed area in polygon 42, the sealing ring 16 will be balanced to establish a clearance between the surfaces 28 and 30.

Operation

The operation of the above described sealing device is as follows. When the pump is operating at a particular operating pressure, there will be a certain amount of leakage flow from the chamber 19 past the surfaces 28, 30 into the backing chamber 20 since the fluid pressure developed by the pump acting on the surfaces 28 and 46 will tend to move the sealing ring axially to increase the distance between the surfaces 28 and 30. Under such conditions the leakage flow into backing chamber 20 will tend to build up the pressure in backing chamber 20 since the exit of fluid from the backing chamber 20 will be hindered by the restriction 32. Thus, the leakage flow past the surfaces 28, 30 will tend to increase until the pressure in backing chamber 20 builds up to a point where the force acting on surface 38 as a result of the built up pressure in backing chamber 20 will balance the force of fluid pressure acting on surfaces 28 and 46, thereby establishing a balanced condition of the sealing ring 16.

Now assuming that the pump developed a higher pressure thereby increasing the pressure in chamber 19, this increased pressure will act against surfaces 46 and 28 tending to move the sealing ring 16 rearward (as viewed in FIG. 1) or away from the surface 30 of the rotating collar 14 to effect an increase in the clearance between the surfaces 28, 30. This will increase the amount of flow past the surfaces 28, 30 and consequently increase the pressure in the backing chamber 20 since it requires more pressure in the backing chamber 20 to pass the increased leakage flow through the restriction 32. The pressure in the backing chamber 20 will increase with increased leakage flow through the restriction 32 as generally indicated in the curve 33 shown in FIG. 3. The increased pressure in the backing chamber 20 acting on the surface 38 will tend to move the sealing ring 16 forwardly toward the collar 14 to counter-balance the force tending to move the sealing ring 16 rearwardly to thereby establish a new balanced condition of the sealing ring 16.

Thus it can be seen from the above description, that the sealing ring is automatically self-balanced and self-adjusted to maintain a constant minimum clearance between the surfaces 28, 30. The sealing ring 16 will be balanced when the force depicted by the enclosed area 40 of FIG. 2a equals the force depicted by the enclosed area 42 of FIG. 2b. When the forces are unbalanced, the sealing ring 16 will move axially until the aforementioned forces are equalized to establish a new balanced condition.

Figures 3A, 3B:
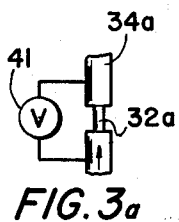
FIGS. 3a–3d are fragmentary sectional views of various restrictions.
Figures 3C, 3D:
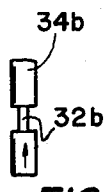

Means may be provided to increase or vary the size of restriction 32. Such means may comprise a valved by-pass 41 (see FIG. 3a) around the restriction 32a, a variable restriction 32b (see FIG. 3b), or the substitution of a larger restriction or orifice (see FIG. 3d).

Figure 3:
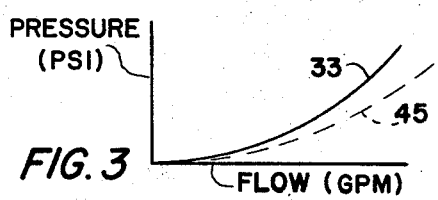
FIG. 3 is a graph showing a curve of flow vs. pressure of the fluid as it passes through the restriction 32 shown in FIG. 1.

Thus if curve 33 in FIG. 3 represents the pressure-flow relationship through the restriction 32 when a certain size X restriction 32c (FIG. 3c) is employed, then curve 45 (FIG. 3) represents the pressure-flow relationship when a larger size Y restriction 32d (FIG. 3d) is used. From these two curves 33, 45 it can be seen that it will require a greater amount of flow through the restriction 32 to build up the pressure in backing chamber 20 when the larger size Y restriction 32d is used (see curve 45) as compared to when the smaller size X restriction 32c is used (see curve 33).

Thus when using a larger size restriction Y, a corresponding greater flow through the restriction 32d will be required to build up the pressure in backing chamber 20 to balance the force of fluid pressure acting on the surfaces 28, 46. Consequently, the sealing ring 16 will achieve a different position with the surfaces 28, 30 further apart (as compared to when a smaller size X restriction 32c is used) to allow such increased flow.

From this description it can be seen that the amount of leakage flow can be controlled by varying the size of restriction 32. Also the size of restriction 32 may be increased (e.g. by opening valve 41, FIG. 3a) for a short period of time to increase the distance between surfaces 28 and 30 for the purposes of blowing out impurities past these surfaces.

More than one sealing ring 16 may be used in order to break down the pressure in a series of stages. When sealing a high pressure fluid it is desirable to have the pressure broken down in stages since each stage of the seal would be more effective in handling a smaller pressure drop per stage. Wear and erosion of the seal faces are reduced with a reduction of pressure drop per stage.

*Alternative embodiments*

Figure 4:
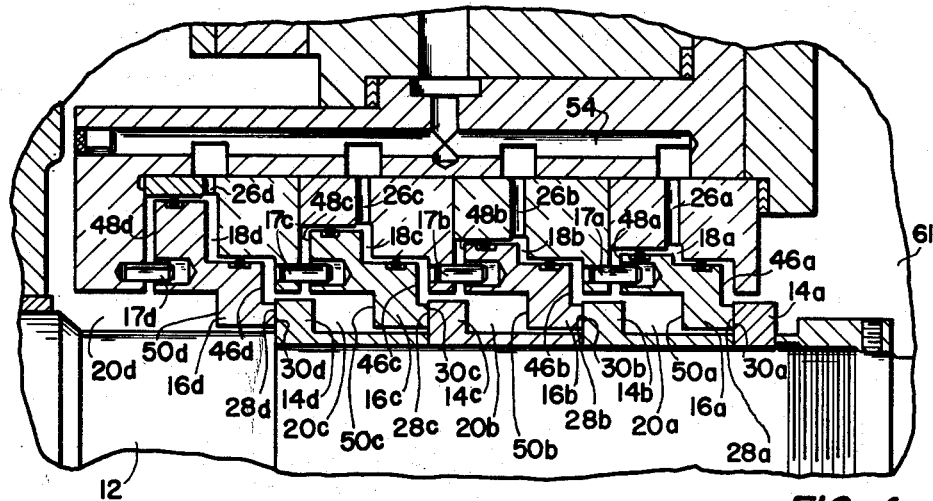
FIG. 4 is a fragmentary sectional view of an alternate embodiment of the present invention showing a series of sealing rings of varying sizes.

In FIG. 4 there are four stages shown including four sealing rings 16a–16d and four collars 14a–14d rotatable with the pump shaft. Each stage of this arrangement is similar to that shown in FIG. 1 except that the sealing rings 16a–16d are shown as having stepped rearward faces 48a, 50a; 48b, 50b, etc. instead of the single rearward face 38 shown in FIG. 1. These stepped faces 48a, 50a, etc. are provided for mechanical reasons (e.g. to provide space for collars 14b–14d) and the basic principle of operation is not changed since the faces 48a, 50a, etc. of FIG. 4 are equivalent to the face 38 of FIG. 1 in terms of function.

Since each of the venting chambers 18a–18d are connected to a common header 54 through the conduits 26a–26d, the fluid pressure in all the venting chambers 18a–18d will be maintained at the same common pressure. If desired, cooling fluid, such as water, may be introduced through the header 54 at a relatively low pressure adequate only to induce flow through the passageways 26a–26d to each stage of the seal. Another set of passageways (not shown) similar to 26a–26d and another header (not shown) similar to header 54 may be used for conducting the cooling fluid from the seal. The relatively low pressure of the cooling fluid in the venting chambers 18a–18d will not appreciably effect the pressure balancing of the sealing rings 16a–16d by the leakage fluid.

The path of leakage flow through the seal shown in FIG. 4 is as follows. The pump leakage will flow past the first stage sealing or restricting surfaces 28a, 30a into the first stage backing chamber 20a with a corresponding drop in leakage fluid pressure. The leakage will then flow past the second stage sealing surfaces 28b, 30b into the second stage backing chamber 20b. A similar flow path is repeated in the third and fourth stages. The pressure of the leakage fluid is reduced as it passes through each stage of the seal. For example, if the pump discharge pressure in chamber 61 is 2500 p.s.i., the seal may be designed so that there will be a 500 p.s.i. pressure drop across each stage of the seal. Thus, there would be a pressure of 2000 p.s.i. in the first backing chamber 20a, 1500 p.s.i. in the second stage backing chamber 20b, 1000 p.s.i. in 20c and 500 p.s.i. in the last stage backing chamber 20d whereby the pressure leaving the final stage of the seal would be 500 p.s.i. In order to provide these equal pressure drops across each stage, the seal rings 16a–16d are each made of a different size. It will be noted that the total area of rearward faces 48a and 50a of the first stage sealing ring 16a is smaller than the total rearward surface area 48b, 50b of the second stage sealing ring 16b and that the corresponding rearward surface areas of the other two sealing rings 16c and 16d also progressively increase. The progressively increasing rearward surface areas on the sealing ring 16a–16d provides greater working areas on which the decreasing pressures in the successive backing chambers 20a–20d may act against in order to balance the decreasing pressure acting on the successive forward restrictive surfaces 28a–28d, and forward surfaces 46a–46d of the sealing rings 16a–16d. In this regard it will be remembered that the pressures in venting chambers 18a–18d are established by a common manifold 54 and are equal. Thus the balancing feature is built into the seal so that the latter stages present sealing or restrictive surfaces 28b, 30b, 28c, 30c, etc. To maintain the equal pressure drop of 500 p.s.i. across each stage, the differential pressure between forward surfaces 28, 46 and corresponding area for rearward surfaces is the same for all stages. The pressure on the forward surfaces exposed to venting chambers is the same for all stages since all venting chambers 18 are manifolded to a common pressure. However pressure on area of rearward faces corresponding to forward face area exposed to venting chamber is less for each successive stage. Therefore to achieve equal balance and equal distance between sealing surfaces 28 and 30, for all stages it is necessary that the "working area" represented by the forward surface exposed to venting chamber and corresponding rearward surface are to be successively increased to compensate for successively decreasing pressures on rearward working surfaces.

In the above example, if it is desired to have the pressure leaving the last stage of the seal to be less than 500 p.s.i., the combined area of annuli 48d and 50d can be increased so that the total area exposed to the pressure leaving the last stage would be greater so that a lower pressure would be required in backing chamber 20d to achieve balance of sealing ring 16d.

Figure 5:
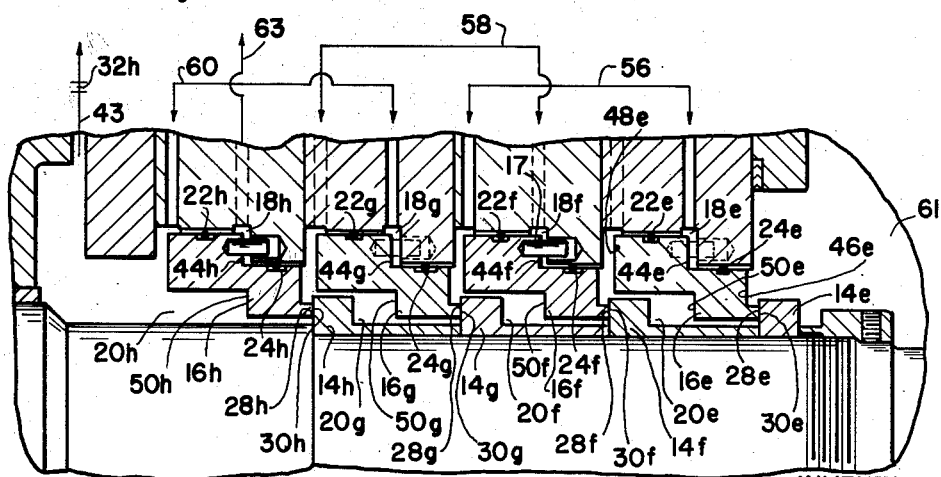
FIG. 5 is a view similar to FIG. 4 showing a fragmentary sectional view of a further alternate embodiment of the present invention showing a series of sealing rings all of the same size.

FIG. 5 illustrates another embodiment of this invention wherein equalizing passages 56, 58 and 60 are provided between the venting chamber of one stage and the backing chamber of the next successive stage, with the venting chamber 18h of the last stage being vented by a conduit 63 to atmosphere. In order to maintain an equal pressure breakdown across each stage of this embodiment, instead of varying the rearward surface areas of successive sealing rings 16e, 16f, 16g, etc. the pressure in each of the venting chambers 18e–18h is varied. More specifically, instead of varying the total areas 48a–48d, 50a–50d on the rearward faces of the sealing rings 16a–16d of the embodiment of FIG. 4, the pressure acting on the forward faces 44e–44h comprising the rearward surface of the venting chambers 18e–18h of FIG. 5 is varied in each stage.

In the embodiment of FIG. 5 the venting chambers 18e–18h, instead of leading to a common header as shown in the embodiment of FIG. 4, are laced back by means of the equalizing passages 56, 58, 60 which provide means for maintaining different pressures in venting chambers 18e–18g while venting chamber 18h is vented to atmosphere through passageway 63. For example, equalizing passage 56 is provided between the first stage venting chamber 18e and the second stage backing chamber 20f. Similarly, an equalizing chamber 58 is provided between the second stage venting chamber 18f and the third stage backing chamber 20g. Also an equalizing passage 60 is provided between the third stage venting 18g and the fourth stage backing chamber 20h while backing chamber 18h is vented to atmosphere by passageway 63. It will be noted in this arrangement that all the sealing rings 16e–16h are of the same size.

As an example, if the seal was exposed to a pump discharge pressure of 2500 p.s.i. at 61 and each pressure stage of the pump was designed to take a pressure drop of 500 p.s.i., then after passing through the four pressure stages shown in FIG. 5 the pressure in the pump leak-off 34h would be 500 p.s.i. Since there is a 500 p.s.i. pressure drop across each stage, the pressure in the first stage backing chamber 20e and the second stage backing chamber 20f will be 2000 p.s.i. and 1500 p.s.i. respectively. Since the second stage backing chamber 20f is connected to the first stage venting chamber 18e by equalizing passage 56 the pressure in each chamber 18e, 20f will be 1500 p.s.i. Similarly, the pressure in the third stage backing chamber 20g will be 1000 p.s.i. and the pressure in the second stage venting chamber 18f will be 1000 p.s.i. as these two chambers 18f, 20g are connected by the equalizing passage 58. Following a similar path, the pressure in the fourth stage backing chamber 20h will be 500 p.s.i. which will be the same as the pressure in the third stage venting chamber 18g as these two chambers 18g, 20h are connected by the equalizing passage 60. The fourth stage venting chamber 18h is, of course, exposed to atmospheric pressure by the passageway 63.

From the description in the preceding paragraph it can be seen that the pressures in the venting chambers 18e–18h vary from 1500 p.s.i. to atmospheric pressure in 500 p.s.i. increments. Similarly, the pressures in the backing chambers 20e–20h vary from 2000 p.s.i. to 500 p.s.i. in 500 p.s.i. increments.

In analyzing each sealing ring 16e–16h in terms of the pressures acting thereon, it will be noted that the relative pressure differentials across each sealing ring 16e–16h will be the same. The relative pressure differentials between backing and venting chambers for each stage are equal. Thus the relative pressure differentials between the following pairs of chambers are each equal to 500 p.s.i.: 18e, 20e; 18f, 20f; 18g, 20g;, 18h, 20h. The relative pressure differentials between the forward and rearward faces of each sealing ring 16e–16h are also equal. Thus the relative pressure differential between the following pairs of chambers are each equal to 500 p.s.i.: 61, 20e; 20e, 20f; 20f, 20g; and 20g, 20h.

Because each sealing ring 16e–16h is subject to the same relative pressure differentials across respective surfaces, each sealing ring 16e–16h may be made of the same size thereby making them interchangeable.

A graphic representation of the forces acting on the sealing rings 16e–16h is shown in FIGS. 6a–6c etc. which are similar to FIGS. 2a–2c in that the area enclosed within the polygons 40, 42 (FIGS. 2a and 2b) and 40a–40d, 42a–42d (FIGS. 6a–9a, 6b–9b etc.) are representative of the total force acting on the sealing ring 16 (FIG. 1) and 16e–16h (FIG. 5).

The forward side 44e, 46e, 28e of the first stage sealing ring 16e in FIG. 6c is acted on by a force represented by the area enclosed in the polygon 42a. This force is balanced on the rearward side 48e, 50e of the sealing ring 16e by the force represented by the polygon 40a. The stepped forward surface 46a of the sealing ring 16e (that area of the sealing ring 16e exposed to the pressure from the pump discharge 61) is exposed to a pressure of 2500 p.s.i. The resulting force acting on the sealing ring 16e is represented by the area $f$, $j$ and $k$ where $j$ and $k$ represents the pressure at the pump discharge 61 (2500 p.s.i.) and $f$ represents the area of the sealing ring 16e exposed to the pressure within the pump discharge 61. The pressure acting on the sealing surface 28e of the sealing ring 16e is represented by the trapezodial area $j$ and $k$, $h$ enclosed within the polygon 42a wherein $h$ represents the area of the surface 28e and $j$ and $k$ represents the pump discharge pressure (2500 p.s.i.). This polygon 42a indicates that the pressure drop across the surfaces 30e 28e is 500 p.s.i. The force acting on the surface 44e defining the venting chamber 18e is represented by the rectangular area $e$, $g$ enclosed within the polygon 42a wherein $e$ represents the area of the surface 44e and $g$ represents the pressure within the venting chamber 18e.

The force represented by the polygon 40a is equal to the total rearward area 48e, 50e of the backing ring 16e multiplied by the pressure in the first stage backing chamber 20e which in this example is 2000 p.s.i.

When the force represented by the area enclosed in the polygon 42a equals the force represented by the area in the polygon 40a the sealing ring 16e will be balanced to maintain the proper clearance between the surfaces 28e and 30e. The shaded areas in each of these polygons 40a, 42a cancel each other out and the forces represented by unshaded areas are equal to one another.

FIGS. 7a–7c represent the pressure-area-relationship for the second stage sealing ring 16f. Similarly, FIGS. 8a–8c and 9a–9c represent this relationship in the other two sealing rings 16g and 16h. These figures show how each sealing ring 16e–16h is pressure balanced to maintain proper clearance with the collars 14e–14h on the pump shaft. It will be noted that in each stage, the forces represented by the unshaded areas of the block diagrams are equal to balance the sealing rings.

With this arrangement the pressure drop across each sealing ring is the same and all the sealing rings are of the same size. This is advantageous in that the sealing rings may be interchanged with one another thereby eliminating the necessity for manufacturing and stocking different size rings.

Another advantage in this arrangement is the fact that the pressure differential to be sealed by the sealing rings 22e–22h and 24e–24h is kept to a minimum. Thus in the example, each one of sealing rings 22e–22h seals against a pressure differential of 500 p.s.i. since that is the difference in pressure between the chambers which the rings 22e–22h seal. Each one of sealing rings 24e–24h seals against a pressure differential of 1000 p.s.i.

Figure 10:
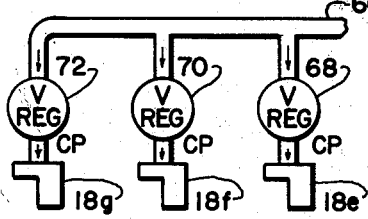
FIG. 10 is a schematic sketch of an alternate embodiment showing the control valves in the conduits to the venting chambers.

As an alternate embodiment it is possible to eliminate the connecting passageways 56, 58 and 60 and provide an external source of fluid pressure to each of the venting chambers 18e–18h. For example, a conduit 66 and pressure control valves 68, 70, and 72 (FIG. 10) may be provided for supplying fluid under pressure to the venting chambers 18e–18g. Using the figures in the example, the pressure control valve 68 would provide fluid at a pressure of 1500 p.s.i. to the first stage venting chamber 18e. A second conduit or pressure control valve 70 may be provided for supplying a pressure of 1000 p.s.i. to the second stage venting chamber 18f. Similarly, a third control valve 72 may be provided for the third stage venting chamber 18g to provide a pressure of 500 p.s.i. The fourth stage venting chamber 18h will be vented to atmosphere.

It will be recognized by those skilled in the art that the objects of the present invention have been achieved by the provision of an improved shaft seal which automatically balances and adjusts itself to maintain a minimum leakage. Since there is no contact between the sealing surfaces, the possibility of wear and breakage is greatly reduced as compared to the mechanical types where the surfaces rub against each other.

While in accordance with the patent statutes one best known embodiment of the present invention has been illustrated and described in detail, it is to be particularly understood that the invention is not limited thereto and thereby.

I claim:

1. In a fluid seal for a rotating shaft, the invention comprising:
   (a) a seal housing containing a pressure chamber subject to fluid pressure and a backing chamber,
   (b) a member having a sealing surface rotatable with and shaft,
   (c) a non-rotating sealing ring located between said pressure chamber and said backing chamber and mounted for axial movement relative to said member,
   (d) said sealing ring having a pressure surface subject to fluid pressure in said pressure chamber acting to force said sealing ring axially away from said member,
   (e) said sealing ring having a backing surface subject to fluid pressure in said backing chamber, acting to force said sealing ring axially toward said member with said backing surface being of substantially larger area than said pressure surface,
   (f) said sealing ring further having a ring sealing surface adjacent said sealing surface on said member forming a restrictive opening therebetween for escape of pressure fluid from said pressure chamber to said backing chamber with the area of said restrictive opening being varied by the axial movement of said sealing ring relative to said member, and
   (g) said housing containing an exhaust passage for exhausting fluid pressure from said backing chamber and having means for restricting the amount of fluid exhausted from said backing chamber to allow sufficient pressure to build up in said backing chamber for maintaining said sealing ring in a pressure-balanced position in proximity to said member.

2. The combination of claim 1 wherein:
(a) said seal housing contains a venting chamber defined in part by a venting surface on said sealing ring.

3. The combination of claim 2 wherein fluid pressure in said venting chamber acts to force said sealing ring axially away from said member.

4. The combination in claim 1 in which said means for restricting flow in said exhaust passage is operable to provide a variable restriction to the flow of fluid from the backing chamber to thereby control the rate of flow of the fluid into the backing chamber and to momentarily change the pressure in said backing chamber.

5. The combination in claim 1 including bypass means for conducting fluid flow around said means for restriction so that when said bypass is operative, the fluid flow through the bypass means reduces the pressure of the fluid in the backing chamber acting on the sealing ring to move said sealing ring to increase the clearance between said sealing surfaces, the position of said sealing ring thereafter being automatically balanced at a new position by the fluid in the backing chamber and the fluid passing through the increased clearance between said sealing surfaces.

6. The combination in claim 3 including conduit means for venting said venting chamber to atmosphere.

7. The combination in claim 3 including conduit means for conducting a control fluid to said venting chamber, the pressure of the control fluid in said venting chamber tending to move the sealing ring away from said member.

8. The combination in claim 3 including means for sealing the fluid in the backing chamber from the venting chamber.

9. The combination in claim 8 including means for sealing the fluid entering the restriction between said sealing surfaces from the venting chamber.

10. A pump sealing device comprising a seal housing, a rotatable shaft, a collar rotatable with said shaft, a non-rotating sealing ring capable of axial movement relative to said collar, said collar and sealing ring having surfaces in close proximity to one another to provide a restriction to fluid flow from the pump, a venting chamber defined at least in part by surfaces on the seal housing and the sealing ring, means for conducting a control fluid to said venting chamber, a pressure surface on said sealing ring partly defining a backing chamber, said backing chamber receiving pump fluid after it has passed through said restriction wherein the pressure of the pump fluid in said backing chamber acting on the last said pressure surface tends to move the sealing ring axially in one direction and the pressure of the control fluid in the venting chamber acting on the sealing ring tends to move the sealing ring in an opposite direction.

11. In a sealing device for a rotating shaft, a plurality of collars rotatable with said shaft, a non-rotating sealing ring adjacent each said collar axially movable relative to said collars, said non-rotating sealing rings being positioned in relation to one another so that there are equal pressure drops across each non-rotating sealing ring, said sealing rings having two pressure surfaces wherein the pressure of pump fluid acting on one pressure surface tends to move the sealing ring axially in one direction away from its adjacent collar and the pressure of fluid acting on the other of said pressure surfaces tends to move the sealing ring in an opposite direction toward its adjacent collar, said axial movement serving to provide a variable restriction between each said collar and its adjacent sealing ring to restrict fluid flow therebetween.

12. The combination in claim 11 including means for sealing the fluid acting on one pressure surface of said sealing ring from the fluid acting on the other pressure surface of said sealing ring thereby permitting unequal pressures to act on said pressure surfaces of said sealing ring.

13. A pump sealing device for reducing leakage pressure in stages comprising a housing member, a rotatable shaft, collars rotatable with said shaft, non-rotating sealing rings adjacent said collars, said sealing rings being capable of axial movement relative to said sealing rings, venting chambers defined at least in part by surfaces on the sealing rings, and means for conducting a control fluid to said venting chambers whereby the force developed by pressure of the control fluid in said venting chambers acting on the sealing rings tends to move the sealing rings axially relative to the collars to provide a plurality of variable restrictions between adjacent sealing rings and collars for progressively reducing the pressure of pump fluid.

14. The combination in claim 13 including a pressure surface on said sealing rings exposed to the pressure of the fluid after it has passed through one restriction associated with one sealing ring, and conduit means connecting the fluid acting on said pressure surface of said one sealing ring with the venting chamber defined in part by another sealing ring located at a stage of the seal of higher pressure.

15. The combination of claim 13 including means between said housing member and sealing rings to prevent fluid flow between the housing member and sealing rings, said means comprising flexible packing operable to seal the control fluid from the pump fluid as the sealing ring is moved axially relative to the housing member.

16. The combination in claim 13 including a backing chamber associated with each sealing ring, said backing chamber being defined in part by pressure surfaces on said sealing rings, and conduit means connecting the venting chamber associated with one sealing ring with the backing chamber associated with another sealing ring located at a stage of the seal of lower pressure.

17. The combination in claim 13 including a backing chamber associated with each sealing ring, said backing chamber being defined in part by pressure surfaces on said sealing rings, each backing chamber receiving pump fluid after such fluid has passed through the restriction associated with the sealing ring having a surface partly defining such backing chamber wherein the pressure of pump fluid in said backing chamber tends to move the sealing rings in one direction, and said means for conducting a control fluid to said venting chamber including pressure control means for controlling the pressure of the control fluid in the venting chamber to thereby control the resulting forces tending to move the sealing rings in an opposite direction.

18. In a sealing device for a rotating shaft, a plurality of collars rotatable with said shaft, a plurality of non-rotating sealing rings axially movable relative to said collars to provide a restriction to fluid flow therebetween, said non-rotating sealing rings being positioned in relation to one another so that there are equal pressure drops across each non-rotating sealing ring, each of said sealing rings having two pressure surfaces wherein fluid acting on one pressure surface tends to move the sealing rings axially in one direction and pressure acting on the other of said pressure surfaces tends to move the sealing ring in an opposite direction, the effective area of said one pressure surface being substantially the same for each sealing ring and the effective area of said other pressure surface being substantially the same for each sealing ring.

19. A pump sealing device for reducing the pressure of leakage fluid in stages comprising a housing member, a rotatable shaft, collars rotatable with said shaft, non-rotating sealing rings adjacent said collars, said sealing rings being capable of axial movement relative to the collars, said collars and sealing rings having surfaces in close proximity to one another to provide a restriction for fluid flow, venting chambers defined at least in part by surfaces of the housing member and pressure surfaces on the sealing rings, and means for supplying a control fluid to the venting chambers, said means being connected to a common source of control fluid supply to provide equal pressure in the venting chambers.

20. The combination of claim 19 wherein the area of the pressure surfaces of the sealing rings partly defining the venting chambers is larger on the sealing rings located at a lower pressure stage of the seal than the corresponding surface on a sealing ring located at a higher pressure stage.

21. The combination in claim 19 including substantially equal pressure surfaces on each said sealing rings partly defining a backing chamber for each sealing ring, said backing chamber receiving fluid pressure after it has passed through said restriction associated with the sealing ring partly defining such backing chamber wherein the fluid pressure in said backing chamber acting on the sealing ring tends to move said sealing ring axially to further restrict the fluid flow through said restriction.

22. The combination of claim 19 wherein the area of the surfaces of the sealing ring partly defining the venting chambers progressively increases for each pressure stage of the pump.

23. The combination in claim 21 including means for controlling the flow of pump fluid from the last stage backing chamber to thereby control the pressure of pump fluid in the last stage backing chamber, the pressure in the backing chambers other than the last stage being established by the restriction in each next downstream stage.

24. A pump sealing device for reducing the pressure of leakage fluid in stages comprising, a housing member, a rotatable shaft, collars rotatable with said shaft, non-rotating sealing rings adjacent said collars, said non-rotating sealing rings being positioned in relation to one another so that there are equal pressure drops across each non-rotating sealing ring, said sealing rings being capable of axial movement relative to the collars, said collars and sealing rings having surfaces in close proximity to one another to provide a restriction to the flow of pump fluid, venting chambers defined at least in part by surfaces of the housing member and the sealing rings, inlet conduit means leading to said venting chambers, outlet conduit means leading from said venting chambers, and means for supplying a cooling fluid to said inlet conduits for circulating cooling fluid through the venting chambers and discharging the cooling fluid through said outlet conduits.

References Cited by the Examiner
UNITED STATES PATENTS

| | | | |
|---|---|---|---|
| 2,531,079 | 11/50 | Payne | 277—16 |
| 2,828,983 | 4/58 | Hunt | 277—16 |
| 2,925,290 | 2/60 | Greenwald | 277—3 |

LEWIS J. LENNY, *Primary Examiner.*

EDWARD V. BENHAM, *Examiner.*